United States Patent [19]

Asano et al.

[11] Patent Number: 6,080,210
[45] Date of Patent: *Jun. 27, 2000

[54] PROCESS FOR PRODUCING ALUMINUM FLUORIDE PARTICLES

[75] Inventors: Motohiko Asano; Toyohiro Nawata, both of Funabashi; Masahiro Numata, Abiko; Koji Okamoto, Niigata; Takashi Goda, Chiba; Kazuyoshi Kamata, Onoda, all of Japan

[73] Assignee: Onoda Chemical Industry Co., Ltd., Japan

[*] Notice: This patent issued on a continued prosecution application filed under 37 CFR 1.53(d), and is subject to the twenty year patent term provisions of 35 U.S.C. 154(a)(2).

[21] Appl. No.: 08/970,474

[22] Filed: Nov. 14, 1997

[30] Foreign Application Priority Data

Sep. 19, 1997 [JP] Japan ..................................... 9-255085

[51] Int. Cl.$^7$ ......................................................... C01B 9/08
[52] U.S. Cl. ........................... 23/301; 423/489; 23/305 A
[58] Field of Search .................................... 423/489, 495; 23/301, 305 A

[56] References Cited

U.S. PATENT DOCUMENTS

| | | |
|---|---|---|
| 3,057,681 | 10/1962 | Gernes et al. ..................... 23/305 A |
| 3,887,693 | 6/1975 | Escribano Nevado et al. ......... 423/489 |
| 3,958,147 | 5/1976 | Becker et al. ......................... 423/489 |
| 4,238,469 | 12/1980 | Schmidt et al. ....................... 423/489 |
| 5,707,406 | 1/1998 | Asano et al. ............................ 23/301 |

FOREIGN PATENT DOCUMENTS

| | | |
|---|---|---|
| 217008 | 9/1958 | Austria . |
| 2134331 | 1/1973 | Germany ............................... 423/489 |
| 072517 | 7/1955 | Japan . |
| 422080 | 1/1935 | United Kingdom ................... 423/489 |

*Primary Examiner*—Ngoc-Yen Nguyen
*Attorney, Agent, or Firm*—Webb Ziesenheim Logsdon Orkin & Hanson, P.C.

[57] ABSTRACT

A process for producing aluminum fluoride particles having a smooth surface, comprising the steps of adding aluminum fluoride seed crystals to a super-saturated solution of aluminium fluoride; allowing aluminum fluoride particles to be precipitated under heating and agitation; collecting the aluminium fluoride particles by filtration; and drying them, wherein: a super-saturated solution of aluminium fluoride containing 0.6 to 1.3 wt % of fluosilicic acid which is preferably obtained by reacting aluminum hydroxide with fluosilicic acid in an $[Al(OH)_3/H_2SiF_6]$ molar ratio of 1.80 to 1.90 is used as the crystallization mother liquor.

3 Claims, 2 Drawing Sheets

PROCESS FOR PRODUCING ALUMINUM FLUORIDE PARTICLES

BACKGROUND OF THE INVENTION

1. Field of the Invention

The present invention relates to a process for producing aluminum fluoride particles having a smooth surface and excellent fluidity. More specifically, it relates to a wet process for producing aluminum fluoride anhydride particles having excellent fluidity preferably with a repose angle of 30° or less efficiently. In the following description, "%" means "% by weight" unless otherwise stated.

2. Description of the Related Art

Aluminum fluoride anhydride is widely used in glazes for ceramic wares, coatings for welding rods, fusing agents for aluminum electrolytic refining and the like. It is also used as a synthesizing catalyst for organic fluorides.

To produce this aluminum fluoride anhydride, there are known a dry process and a wet process. The dry process comprises fluorinating aluminum hydroxide with a hydrogen fluoride gas and the wet process comprises adding aluminum hydroxide to hydrofluoric acid to produce a super-saturated solution of aluminum fluoride and crystallizing aluminum fluoride from this solution.

Since the wet process can use fluosilicic acid ($H_2SiF_6$) which is more inexpensive than hydrofluoric acid, it is industrially advantageous and further has such an advantage that a product having relatively higher purity than that of the dry process can be obtained. However, aluminum fluoride produced by the conventional wet process is inferior in fluidity because the surface of an aluminum fluoride particle is covered with needle-like or column-like crystals. For example, when aluminum fluoride particles are used as a flux for aluminum electrolytic refining, they are liable to clog a transport pipe or tank. Therefore, the dry process is now used in most cases.

As an example of the conventional wet process, U.S. Pat. No. 3,057,681 discloses a process for producing aluminum fluoride particles which comprises a first step of producing a super-saturated solution of aluminum fluoride through a reaction between aluminum hydroxide and fluosilicic acid and a second step of adding aluminum fluoride seed crystals after silica is removed from this super-saturated solution to crystallize aluminum fluoride on the surface of the seed crystal so as to grow a particle.

In this process, although the difference of filterability of silica is studied by changing the reaction amounts (molar ratio) of aluminum hydroxide and fluosilicic acid in the first step, the influence of fluosilicic acid is not taken into account in the crystallization reaction of the second step. Further, a description of general reaction conditions such as solution concentration, liquid temperature, and the particle diameter and amount of the seed crystals added is given but the fluidity of the obtained aluminum fluoride particles is not studied at all. Therefore, as the repose angle of aluminum fluoride anhydride obtained through this crystallization reaction is about 40°, its fluidity is low.

Austrian Patent No.217,008 teaches a wet process for producing aluminum fluoride through a reaction between fluosilicic acid. In this process a 0.5 to 5 wt % excess of fluosilicic acid is reacted with aluminum hydroxide (equivalent to a reaction molar ratio of $Al(OH)_3/H_2SiF_6$ of about 1.90 to 1.99) to improve the production efficiency. This is aimed to increase the crystallization speed of aluminum fluoride and not to improve the fluidity of the obtained aluminum fluoride. In fact, aluminum fluoride particles obtained by this process have low fluidity with a repose angle of 40° like those produced by other wet processes.

SUMMARY OF THE INVENTION

The present invention has solved the above problems of the conventional processes for producing aluminum fluoride particles and it is an object of the present invention to provide a process for obtaining aluminum fluoride particles having a smooth surface and excellent fluidity.

That is, according to a first aspect of the present invention, there is provided a process for producing aluminum fluoride particles having a smooth surface, comprising the steps of adding aluminum fluoride seed crystals to a super-saturated solution of aluminium fluoride; allowing aluminum fluoride particles to be precipitated under heating and agitation; collecting said aluminium fluoride particles by filtration; and drying them, wherein: a super-saturated solution of aluminium fluoride containing 0.6 to 1.3 wt % of fluosilicic acid is used as a crystalization mother liquor.

According to a second aspect of the present invention, there is provided a process for producing aluminum fluoride, wherein a super-saturated solution of aluminum fluoride obtained by reacting aluminum hydroxide with fluosilicic acid in a molar ratio $[Al(OH)_3/H_2SiF_6]$ of 1.80 to 1.90 is used as the crystallization mother liquor.

As described above, the production process of the present invention is a process for producing aluminum fluoride particles having excellent fluidity by using a super-saturated solution of aluminum fluoride containing a specific amount of fluosilicic acid as a crystallization mother liquor.

The inventors of the present invention previously found that aluminum fluoride particles having excellent fluidity can be obtained by using a super-saturated solution of aluminum fluoride having a super-saturation concentration much higher than a saturation concentration (Japanese Laid-open Patent Application No.hei07-2517). The above publication discloses a process for producing aluminum fluoride anhydride particles having an average particle diameter of 100 μm or more efficiently by using seed crystals having a specific size. In this process aluminum fluoride particles having excellent fluidity can be obtained by adjusting the concentration of aluminum fluoride at the start of crystallization to 8 to 15% much higher than saturation concentration (1.6%).

The present invention includes process for producing aluminum fluoride particles having more excellent fluidity using a method for adjusting the concentration of aluminum fluoride at the start of crystallization.

That is, according to a third aspect of the present invention, there is provided a production process, wherein a super-saturated solution of aluminum fluoride containing 0.6 to 1.3 wt % of fluosilicic acid and having an aluminum fluoride concentration at the start of crystallization of 9 to 17 wt % is used as a crystallization mother liquor.

Further, according to a fourth aspect of the present invention, there is provided a process for producing aluminum fluoride particles having an average particle diameter of 80 μm or more and a smooth surface, which comprises the steps of using a super-saturated solution of aluminum fluoride containing 0.6 to 1.3 wt % of fluosilicic acid and having an aluminum fluoride concentration at the start of crystallization of 9 to 17 wt % as a crystallization mother liquor; adding aluminum fluoride particles containing particles having a particle diameter of 40 μm or more in a proportion of 95 wt % or more as seed crystals to the crystallization mother liquor in such an amount that the total surface area of the seed crystals per 1 kg of aluminum fluoride crystallized until its saturation concentration is reached should be 40 to 100 m$^2$; and stirring the solution at 75° C. or more to crystallize the aluminum fluoride particles.

Further, according to fifth, sixth and seventh aspects of the present invention, there are provided a process for producing aluminum fluoride particles having a repose angle of 35° or less, preferably 30° or less, a process for obtaining aluminum fluoride anhydride particles by drying aluminum fluoride collected by filtration after crystallization and dehydrating it by calcination, and a process, wherein crystallization is repeated using aluminum fluoride particles collected by filtration after crystallization as seed crystals, respectively.

DETAILED DESCRIPTION OF THE PREFERRED EMBODIMENTS

Figure 1:
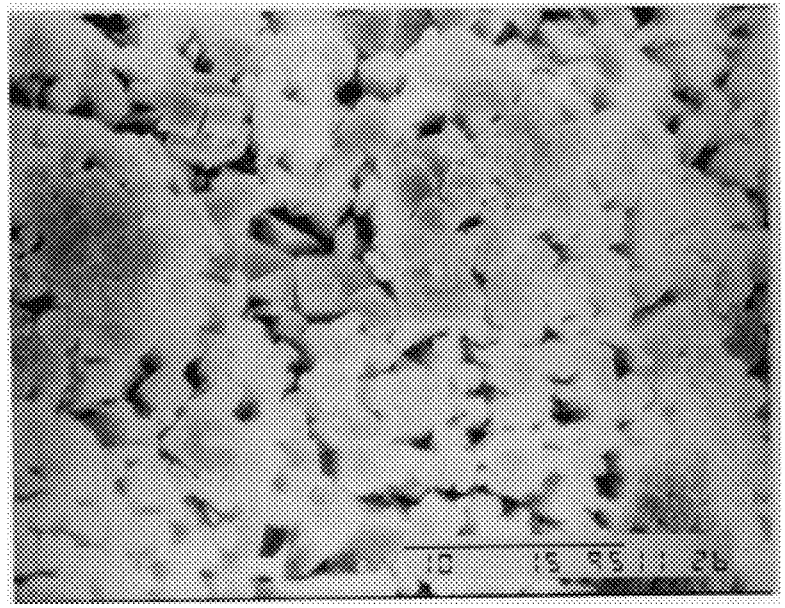
FIG. 1 is a microphotograph (magnification of 3500) showing a crystal growth state on the surface of an aluminum fluoride particle shown in sample No. 3 of test example.

The following examples and comparative examples are given to further illustrate the present invention.
(I) basic reaction The process for producing aluminum fluoride particles of the present invention basically comprises the steps of adding aluminum fluoride seed crystals to a super-saturated solution of aluminum fluoride, allowing aluminum fluoride particles to be precipitated under heating and agitation; collecting said aluminium fluoride particles by filtration; and drying them.

The aluminum fluoride trihydrate (AlF$_3$·3H$_2$O) seed crystals are added to a super-saturated solution of aluminum fluoride and heated and stirred, whereby aluminum fluoride is crystallized on the surface of the seed crystal as a hydrate, and this crystallization proceeds until the aluminum fluoride in the solution reaches its saturation concentration. The saturation concentration of aluminum fluoride in the aqueous solution of aluminum fluoride at a temperature range of normal temperature to around 100° C. is about 1.6%. Stated more specifically, when the seed crystals are added to a super-saturated solution having an aluminum fluoride concentration of 15%, heated at around 100° C. and stirred, aluminum fluoride contained in the solution is crystallized on the surface of the seed crystal until the concentration of aluminum fluoride reaches a saturation concentration of 1.6%.

Thus, aluminum fluoride particles can be obtained by the growth of the seed crystal.

After crystallization, the aluminum fluoride particles are collected by solid-solution separation, dried and calcinated at a high temperature of several hundred centigrade as required to obtain aluminum fluoride anhydride particles from which crystallization water has been removed.
(II) concentration of fluosilicic acid The production process of the present invention is characterized in that a super-saturated solution of aluminum fluoride containing 0.6 to 1.3 wt % of fluosilicic acid is used in the above crystallization reaction as a crystallization mother liquor.

The super-saturated solution of aluminum fluoride containing fluosilicic acid is obtained by adding fluosilicic acid having the above concentration to the super-saturated solution of aluminum fluoride. Alternately, it can be obtained by using an excess of fluosilicic acid with respect to aluminum hydroxide when aluminum hydroxide and fluosilicic acid are reacted with each other to produce a super-saturated solution of aluminum fluoride.

In other words, the super-saturated solution of aluminum fluoride used as a crystallization mother liquor in the present invention is obtained by reacting aluminum hydroxide with fluosilicic acid in an [Al(OH)$_3$/H$_2$SiF$_6$] molar ratio of 1.80 to 1.90.

When the super-saturated solution of aluminum fluoride obtained by reacting aluminum hydroxide with fluosilicic acid in an [Al(OH)$_3$/H$_2$SiF$_6$] molar ratio of 2 is used as a crystallization mother liquor, the surface of the obtained aluminum fluoride particle is covered with column-like crystals, and recesses are formed in the surface of each crystals, since gaps between crystals are not completely filled. Therefore, the fluidity of the aluminum fluoride particles is not improved with a repose angle of about 40°.

On the other hand, when a super-saturated solution of aluminum fluoride containing fluosilicic acid in the above range of concentration is used as a crystallization mother liquor, aluminum fluoride particles having a smooth surface covered with deposited crystals without gaps can be obtained. Since the repose angle of most of the particles is about 35° or less, preferably 30° or less, the particles have excellent fluidity.

When the concentration of fluosilicic acid is outside the above range, the surface of each of the aluminum fluoride particles is covered with needle-like crystals, thereby greatly reducing fluidity, or gaps between column-like crystals covering the surface of the particle are large, thereby making it impossible to improve fluidity.
(III) concentration of aluminum fluoride The production process of the present invention employs as a crystallization mother liquor a super-saturated solution of aluminum fluoride containing fluosilicic acid in a specific concentration, preferably 9 to 17 wt %.

When the fluosilicic acid is present in the above range of concentration and the concentration of aluminum fluoride at the start of crystallization is in the above range, a large number of deposition points are uniformly produced on the entire surface of the seed crystal at the start of crystallization, and aluminum fluoride crystallizes from these points. Therefore, the entire surface closely grows and particles having a smooth surface can be obtained. The concentration of aluminum fluoride is advantageously 9 wt % or more. When it is 9.5 wt % to 17 wt %, particles having a smoother surface can be obtained.

On the other hand, when fluosilicic acid is not present and the concentration of fluosilicic acid and the concentration of aluminum fluoride at the start of crystallization are outside the above ranges, deposition points are produced nonuniformly on the surface of the seed crystal at the start of crystallization, and crystallization proceeds mainly from these points. Therefore, needle-like crystals or column-like crystals grow from these deposition points, and the surface of the seed crystal is covered with the needle-like crystals or gaps between column-like crystals growing on the surface of the particle become large. As a result, aluminum fluoride particles having a smooth surface cannot be obtained and the fluidity of the aluminum fluoride particles is very low.

Even if the concentration of aluminum fluoride contained in the super-saturated solution is within the range of the present invention or outside the range of the present invention at the start of crystallization, the concentration of aluminum fluoride gradually reaches its saturation concentration along with the proceeding of crystallization. However, when the concentration of aluminum fluoride at the start of crystallization is different, it greatly affects the subsequent crystallization state with the result that aluminum fluoride particles having a greatly different surface state are obtained.

As described above, the production process of the present invention is characterized in that a super-saturated solution of aluminum fluoride containing fluosilicic acid in the above-described concentration and preferably having an aluminum fluoride concentration about 6 to 10 times higher than its saturation concentration at the start of crystallization is used as a crystallization mother liquor.

Incidentally, in the above Austrian Patent (DAS 217008), a 0.5 to 5% excess of fluosilicic acid is used with respect to aluminum hydroxide. It is explained that this is because aluminum fluorosilicate is caused to be present in the solution in a concentration of 0.1 to 2%. This concentration is equivalent to an $Al(OH)_3/H_2SiF_6$ molar ratio of about 1.90 to 1.99, which is obviously different from the concentration range of fluosilicic acid of the present invention.

In the above-described U.S. Pat. No. 3,057,681 the concentration of fluosilicic acid under study is 2 to 5% excessive [equivalent to an $Al(OH)_3/H_2SiF_6$ molar ratio of about 1.90 to 1.96] with respect to aluminum hydroxide, which is lower than the concentration range of fluosilicic acid of the present invention.

Therefore, particles having excellent fluidity are not obtained.

(IV) test examples

A fluosilicic acid solution and aluminum hydroxide were reacted with each other in a molar ratio shown in Table 1, and the produced silica was separated by filtration to prepare a super-saturated solution of aluminum fluoride having a concentration of aluminum fluoride and a concentration of fluosilicic acid shown in Table 1. Aluminum fluoride particles having an average particle diameter of 78 μm (specific surface area of 36.8 m²/kg) were added as seed crystals to this super-saturated solution of aluminum fluoride, the resulting solution was maintained at a temperature of 93° C., stirred at a rate of 1.5 m/sec for 5 hours, and aluminum fluoride was deposited on the surfaces of the seed crystals to grow seed crystal particles. After crystallization, the crystal particles were collected by filtration and dried at 105° C. for 3 hours to obtain aluminum fluoride trihydrate particles ($AlF_3 \cdot 3H_2O$).

The surface condition, average particle diameter and repose angle of the particles are shown in Table 1. The particle surface conditions of part of the samples are shown in FIGS. 1 to 4. The amount of the seed crystals added for each sample is such that the total surface area per 1 kg of deposited aluminum fluoride trihydrate ($AlF_3 \cdot 3H_2O$) should be 70 m². The repose angle was obtained by supplying powders onto a disk having a diameter D (70 mm) placed horizontally through a funnel equipped with a sieve, accumulating them on the disk and measuring the height H (mm) of a conical accumulated layer. The repose angle φ is given by the equation $\phi = \tan^{-1}(2H/D)$

TABLE 1

| Sample No | Super-saturated solution of aluminum fluoride | | | Amount of seed crystals (Kg) | Crystallization filtrate | Collected aluminum fluoride particles | | | |
|---|---|---|---|---|---|---|---|---|---|
| | molar ratio | AlF₃ (%) | H₂SiF₆ (%) | amount of use (Kg) | | AlF₈ (%) | amount of collection | average particle diameter | repose angle | surface state |
| 1 | 2.00 | 17.49 | 0.03 | 7050 | 3599 | 1.49 | 5499 (71.4) | 87.2 | 40 | X (FIG. 4) |
| 2 | 1.95 | 17.21 | 0.31 | 7002 | 3511 | 1.55 | 5359 (75.8) | 87.8 | 36 | X |
| 3 | 1.90 | 16.82 | 0.61 | 6965 | 3405 | 1.64 | 5190 (78.2) | 89.5 | 30 | O (FIG. 1) |
| 4 | 1.80 | 16.12 | 1.24 | 6880 | 3209 | 1.86 | 4872 (79.5) | 89.6 | 29 | O (FIG. 2) |
| 5 | 1.75 | 15.78 | 1.56 | 6837 | 3115 | 1.99 | 4717 (65.6) | 85.5 | 45 | X (FIG. 3) |
| 6 | 1.95 | 10.58 | 0.19 | 6259 | 1812 | 1.55 | 2765 (75.4) | 90.2 | 41 | X |
| 7 | 1.90 | 10.33 | 1.00 | 6235 | 1766 | 1.49 | 2694 (73.0) | 89.7 | 35 | O |
| 8 | 1.85 | 13.10 | 0.74 | 6528 | 2402 | 1.64 | 3665 (80.1) | 90.0 | 26 | O |
| 9 | 1.65 | 10.57 | 1.55 | 6259 | 1794 | 1.65 | 2738 (72.0) | 79.8 | 42 | X |

(Notes)
The molar ratio indicates an $Al(OH)_3/H_2SiF_6$ ratio, $AlF_8$ % indicates a concentration (wt %) of aluminum fluoride, and $H_2SiF_6$ % indicates a concentration (wt %) of fluosilicic acid.
The figures within the parentheses for the amount of collection indicates the collection rate of particles having a particle diameter of 80 μm or more out of collected particles.
The unit of the average particle diameter is μm and the unit of the repose angle is "°".
Surface state: O indicates a smooth state and X indicates that there are many gaps between needle-like or column-like crystals.

Figure 3:
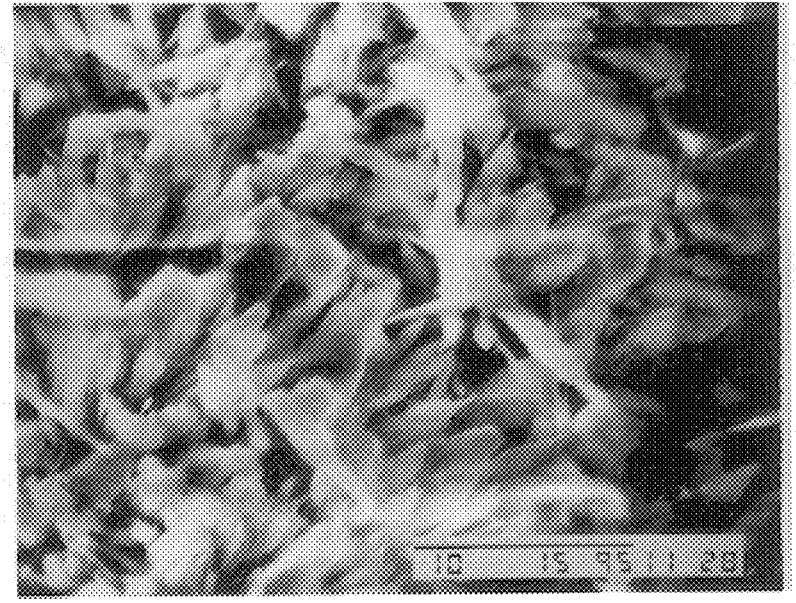
FIG. 3 is a microphotograph (magnification of 3500) showing a crystal growth state on the surface of an aluminum fluoride particle shown in sample No. 5 of the test example.
Figure 4:
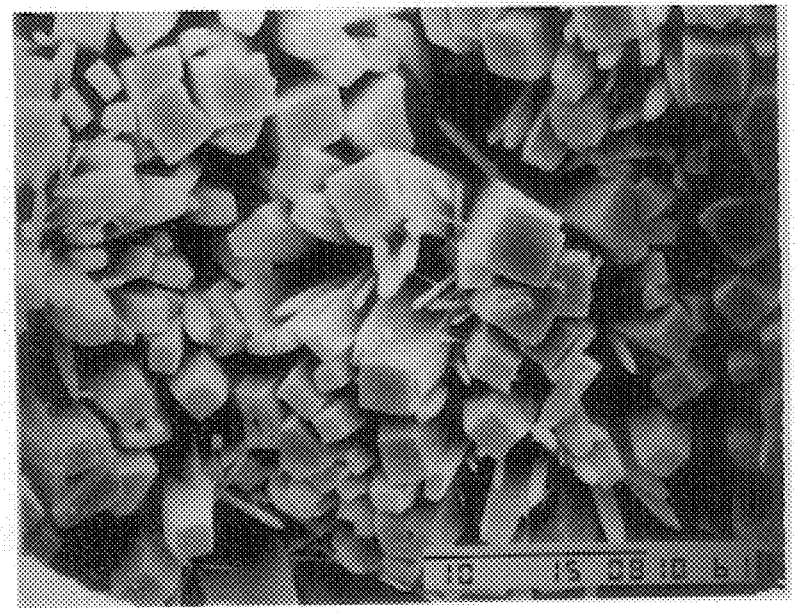
FIG. 4 is a microphotograph (magnification of 3500) showing a crystal growth state on the surface of an aluminum fluoride particle shown in sample No. 1 of the test example.

As is evident from these test examples, sample No.1 which was prepared using a super-saturated solution of aluminum fluoride ($Al(OH)_3/H_2SiF_6$ molar ratio of 2.0, fluosilicic acid concentration of 0.03%) obtained by reacting fluosilicic acid and aluminum hydroxide in stoichiometrical amounts has low fluidity with a repose angle of 40°, because gaps between column-like crystals covering the surface of an aluminum fluoride particle are large as shown in FIG. 4. Sample No.5 which was prepared using a super-saturated solution having a fluosilicic acid concentration higher than the range of the present invention has extremely low fluidity with a repose angle of 45°, because the surface of a particle is covered with needle-like crystals and surface irregularities are large as shown in FIG. 3.

Figure 2:
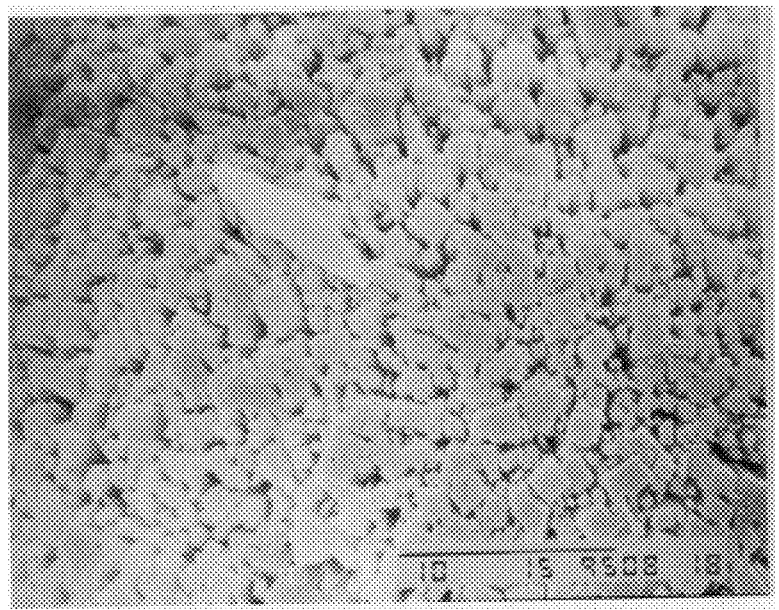
FIG. 2 is a microphotograph (magnification of 3500) showing a crystal growth state on the surface of an aluminum fluoride particle shown in sample No. 4 of the test example.

On the other hand, in sample Nos.3 and 4 which were prepared using a super-saturated solution of aluminum fluoride (fluosilicic acid concentration of 0.31 to 1.24%) containing fluosilicic acid in a concentration within the range of the present invention by adjusting the molar ratio [Al(OH)$_3$/H$_2$SiF$_6$] of aluminum hydroxide to fluosilicic acid to 1.80 to 1.90, crystals grow closely on the surface of an aluminum fluoride particle as shown in FIGS. 1 and 2. Therefore, the number of gaps between crystals is small and a particle having a smooth surface is obtained. The repose angle of the particles of sample Nos.3 and 4 are 30° and 29°, respectively, and these particles are far superior in fluidity to other particles (sample Nos.1, 2 and 5).

Samples Nos.1 to 5 show the cases where the concentration of aluminum fluoride is in the range of 15 to 17% and the concentration of fluosilicic acid contained in the crystallization mother liquor is different. As shown in sample Nos.6 to 9, when the concentration of aluminum fluoride contained in the crystallization mother liquor is in the range of 10 to 13%, the same result is obtained. That is, the particles of sample Nos.7 and 8 prepared under the condition that the concentration of fluosilicic acid is within the range of the present invention have excellent fluidity and a small number of gaps on the surface. On the other hand, the particles of sample Nos.6 and 9 prepared under the condition that the concentration of fluosilicic acid is outside the range of the present invention have low fluidity and a large number of gaps on the surface.

(V) production of aluminum fluoride anhydride

Aluminum fluoride collected by filtration and drying after crystallization is a hydrate containing crystallization water (AlF$_3$·3H$_2$O), and aluminum fluoride anhydride (AlF$_3$) is obtained by removing the crystallization water from the aluminum fluoride by calcination at several hundred centigrade. The calcination is carried out by heating at a temperature of 300 to 700° C. for several hours.

(VI) repetition of crystallization step

The production process of the present invention makes it possible to repeat the crystallization step using aluminum fluoride particles collected by filtration through the crystallization step as the seed crystals. Thereby, aluminum fluoride particles having a large particle diameter can be obtained.

Stated more specifically, by heating a super-saturated solution of aluminum fluoride at around 100° C. and stirring it, aluminum fluoride particles separate out in the solution. They are collected by filtration and recycled to the crystallization step to be used as the seed crystals. Deposited layers are piled up on the surface of the seed crystal by recycling the collected aluminum fluoride particles to the crystallization step and repeating the crystallization step. Thus, aluminum fluoride particles having a large particle diameter are formed.

(VII) production of particles having an average particle diameter of 80 μm or more In the above production process of the present invention, aluminum fluoride particles having an average particle diameter of 80 μm or more and excellent fluidity can be obtained efficiently by adjusting the particle diameter and amount of the seed crystals to be added. In other words, the seed crystals containing 95% or more of particles having a particle diameter of 40 μm or more are added to the above super-saturated solution of aluminum fluoride as a crystallization mother liquor in such an amount that the total surface area of the seed crystals per 1 kg of aluminum fluoride crystallized until its saturation concentration is reached should be 40 to 100 m$^2$ and stirred at 75° C. or more to crystallize aluminum fluoride, thereby making it possible to produce aluminum fluoride particles having an average particle diameter of 80 μm or more, a smooth surface and excellent fluidity.

The seed crystals containing 95% or more of particles having a particle diameter of 40 μm or more, preferably 50 μm or more, are used. If the seed crystals contain 5% or more of fine particles having a particle diameter of less than 40 μm, the fluidity of the obtained particles will lower because the fine particles become needle-like crystals.

The amount of the seed crystals to be added is such that the total surface area of the seed crystals per 1 kg of aluminum fluoride crystallized until its saturation concentration is reached should be 40 to 100 m$^2$. In other words, when the amount of aluminum fluoride crystallized until its saturation concentration is reached is represented by X (kg), the surface area per 1 kg of the seed crystals is represented by A (m$^2$/kg), and the amount of the seed crystals added is represented by Y (kg), the total surface area of all the seed crystals is A Y m$^2$ and the total surface area of all the seed crystals per 1 kg of aluminum fluoride crystallized until its saturation concentration is reached is given by (AY)/X. Therefore, the amount Y of the seed crystals added satisfies the equation (A Y)/X=40 to 100. Since the deposition amount X of aluminum fluoride is determined by the concentration of aluminum fluoride at the start of crystallization and the surface area A of the seed crystals is determined by their average particle diameter, the amount Y of the seed crystals to be added can be determined from these values.

When the surface area of the seed crystals is less than 40 m$^2$, the amount of the seed crystals is relatively small and a large number of crystal nuclei other than the seed crystals are produced in the solution and the crystallization of aluminum fluoride starts from these, thereby checking the growth of the seed crystals. Therefore, the number of fine particles increases and it is difficult to obtain particles having a large particle diameter efficiently. On the other hand, when the surface area of the seed crystals is more than 100 m$^2$, the amount of the seed crystals is large, whereby stirring becomes incomplete and the seed crystals do not grow uniformly. Further, the solid content of the solution increases, thereby making operation difficult.

The appropriate crystallization temperature is 75° C. or more. At a temperature lower than 75° C., the crystallization speed is low disadvantageously. The upper limit of the crystallization temperature may be lower than the boiling point of aluminum fluoride. The heating method and stirring method are not particularly limited.

According to the production process of the present invention, aluminum fluoride particles having excellent fluidity with a repose angle of 35° or less, preferably 30° or less, can be produced easily based on a wet process. By controlling the average particle diameter and amount of seed crystals to be added, aluminum fluoride particles having an average particle diameter of 80 μm or more, preferably 100 μm or more, a smooth surface and excellent fluidity can be produced at a high yield.

[EXAMPLES AND COMPARATIVE EXAMPLES]

Example 1

Aluminum fluoride particles having an average particle diameter of 80 μm (containing particles having a specific surface area of 35.88 m$^2$/kg and a particle diameter of 40 μm or more in a proportion of 95% or more) are added as seed crystals to a super-saturated solution of aluminum fluoride having an aluminum fluoride concentration and a fluosilicic acid concentration shown in Table 2. The solution was maintained at a temperature of 93° C. and stirred at a rate of 1.5 m/sec for 5 hours, and aluminum fluoride was deposited on the surfaces of the seed crystals to grow seed crystal particles. After crystallization, the particles were collected by filtration and dried at 105° C. for 3 hours to obtain aluminum fluoride trihydrate particles ($AlF_3 \cdot 3H_2O$). The surface conditions of these particles were observed to obtain their average particle diameter and repose angle. The results are shown in Table 2 (sample Nos. B-1 to B-6). The amount of the seed crystals added in each sample was such that their total surface area per 1 kg of deposited aluminum fluoride ($AlF_3 \cdot 3H_2O$) should have been 50 $m^2$. The repose angle was measured in the same manner as in the test samples.

Comparative Example

A crystallization reaction was carried out using a super-saturated solution of aluminum fluoride having a fluosilicic acid concentration outside the range of the present invention or a super-saturated solution of aluminum fluoride having an aluminum fluoride concentration outside a preferable range of the present invention as a crystallization mother liquor under the same conditions as in Example 1, and the surface state, average particle diameter and repose angle of the collected particles were investigated. These results are shown in Table 2 (sample Nos.C-1 to C-4).

a specific concentration should be used and the concentration of aluminum fluoride at the start of crystallization should be controlled to 9 to 17%, preferably 9.5 to 17%.

Example 2

1745.6 g (equivalent to a total surface area per 1 kg of deposited $AlF_3 \cdot 3H_2O$ of 50 $m^2$) of aluminum fluoride particles of sample No.B-5 obtained in Example 1 (average particle diameter of 95.8 μm, specific surface area of 30 $m^2$/kg) were added as seed crystals to 5000 kg of a super-saturated solution of aluminum fluoride having a fluosilicic acid concentration of 0.99 wt % and an aluminum fluoride concentration of 14.0 wt %. The solution was maintained at a temperature of 93° C. and stirred at a rate of 1.5 m/sec for 5 hours, and aluminum fluoride was deposited on the surfaces of the seed crystals to grow seed crystal particles. The crystallization was terminated when the concentration of aluminum fluoride became 1.6 wt %, the aluminum fluoride particles were collected by filtration and dried at 105° C. for 3 hours to collect 2793 kg of aluminum fluoride particles. The obtained particles had an average particle diameter of 110 μm and a smooth surface. Further, part of the particles were calcinated at 450° C. and then at 700° C. to obtain aluminum fluoride anhydride. The aluminum fluoride anhydride had a repose angle of 26°.

TABLE 2

| | Super-saturated solution of aluminum fluoride | | | Amount of seed crystals (Kg) | Crystallization filtrate | Collected aluminum fluoride particles | | | |
|---|---|---|---|---|---|---|---|---|---|
| Sample No | molar ratio | $AlF_3$ (%) | $H_2SiF_6$ (%) | amount of use (Kg) | | $AlF_8$ (%) | amount of collection | average particle diameter | repose angle | surface state |
| B-1 | 1.8 | 16.12 | 1.24 | 6880 | 2351 | 1.86 | 4013 (82.3) | 95.4 | 29 | O |
| B-2 | 1.8 | 9.74 | 1.19 | 6178 | 1184 | 1.62 | 2031 (82.0) | 94.6 | 29 | O |
| B-3 | 1.9 | 16.82 | 0.61 | 6965 | 2495 | 1.64 | 4280 (83.0) | 95.7 | 29 | O |
| B-4 | 1.9 | 9.52 | 0.64 | 6155 | 1148 | 1.59 | 1972 (85.6) | 93.8 | 29 | O |
| B-5 | 1.8 | 14.19 | 1.09 | 6650 | 1971 | 1.59 | 3385 (80.5) | 95.8 | 27 | O |
| B-6 | 1.8 | 9.08 | 0.70 | 6112 | 1077 | 1.59 | 1849 (77.1) | 96.0 | 33 | O |
| C-1 | 1.9 | 19.86 | 0.72 | 7370 | 3167 | 1.52 | 5445 (82.1) | 93.8 | 41 | X |
| C-2 | 1.8 | 7.25 | 0.72 | 5942 | 792 | 1.86 | 1334 (75.5) | 94.9 | 40 | X |
| C-3 | 1.75 | 15.78 | 1.59 | 6837 | 2282 | 1.99 | 3884 (77.3) | 95.7 | 45 | X |
| C-4 | 1.95 | 7.25 | 0.34 | 5942 | 792 | 1.49 | 1368 (77.1) | 96.0 | 40 | X |

(note) Items in the above table are the same as those of Table 1.

As shown in Table 2, all the aluminum fluoride particles of sample Nos.B-1 to B-6 of the present invention have a smooth surface and excellent fluidity with a repose angle of 33° or less. Out of these, aluminum fluoride particles obtained under the condition that the aluminum fluoride concentration at the start of crystallization is 9.5wt % or more have further improved fluidity with a repose angle of 29° or less. The average particle diameters of these aluminum fluoride particles range from about 93 to 96 μm and the yield of particles having a particle diameter of 80 μm or more is about 80 to 86%. Aluminum fluoride particles having a uniform particle diameter can be obtained at a high yield.

Meanwhile, in Comparative Examples (sample Nos.C-1 to C-4 obtained under the condition that the concentration of aluminum fluoride is outside a preferable range (9 to 17%) of the present invention), all the collected aluminum fluoride particles have a repose angle of 40° or more.

Therefore, to further improve fluidity, a super-saturated solution of aluminum fluoride containing fluosilicic acid in

What is claimed is:

1. A process for producing aluminum fluoride particles having a repose angle under 30°, comprising the steps of adding aluminum fluoride seed crystals to a supersaturated solution of aluminum fluoride containing 0.6 to 1.3 wt % of fluosilicic acid and 13 to 17 wt % of aluminum fluoride; heating and agitating the resulting mixture to crystallize aluminum fluoride particles; collecting said aluminum fluoride particles by filtration; and drying the collected aluminum fluoride particles.

2. A process for producing aluminum fluoride anhydride particles having an average particle diameter of 80 μm or more and a repose angle under 30°, comprising the steps of:

(a) preparing an initial supersaturated solution of aluminum fluoride containing 0.6 to 1.3 wt % of fluosilicic acid and 13 to 17 wt % of aluminum fluoride;

(b) adding aluminum fluoride particles containing particles having a particle diameter of 40 μm or more in a proportion of 95% or more as seed crystals to the initial supersaturated solution in such an amount that the total surface area of the seed crystals per I kg of aluminum fluoride crystallized until its saturation concentration is reached is 40 to 100 m$^2$;

(c) heating the solution at 75° C. or more to crystallize aluminum fluoride particles under agitation;

(d) collecting the aluminum fluoride particles by filtration:

(e) drying the collected aluminum fluoride; and (f) calcining to dehydrate the dried aluminum fluoride, thereby obtaining aluminum fluoride anhydride particles.

3. The process of claim 2 wherein all the steps are repeated and the aluminum fluoride particles collected by filtration in a step (d) are used as seed crystals for the subsequent step (b).

* * * * *